US007847450B2

(12) United States Patent
Kakuda et al.

(10) Patent No.: US 7,847,450 B2
(45) Date of Patent: Dec. 7, 2010

(54) HYBRID DRIVE UNIT

(75) Inventors: Kentaro Kakuda, Anjo (JP); Ryohei Kubo, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 179 days.

(21) Appl. No.: 12/320,818

(22) Filed: Feb. 5, 2009

(65) Prior Publication Data

US 2009/0206709 A1  Aug. 20, 2009

(30) Foreign Application Priority Data

Feb. 20, 2008  (JP)  ............................. 2008-038992

(51) Int. Cl.
*H02K 5/00* (2006.01)
(52) U.S. Cl. ........................................................ 310/89
(58) Field of Classification Search .................... 310/89, 310/67 R, 68 R, 68 D; *H02K 5/22*
See application file for complete search history.

(56) References Cited

U.S. PATENT DOCUMENTS 6,719,096 B2 *  4/2004  Mogi .......................... 184/6.23
7,464,626 B2 *  12/2008  Yamazaki et al. ............ 74/606 R

FOREIGN PATENT DOCUMENTS

| JP | A-62-46744 | 2/1987 |
|---|---|---|
| JP | A-8-65945 | 3/1996 |
| JP | A-9-182352 | 7/1997 |
| JP | A-2003-32942 | 1/2003 |
| JP | A-2004-122979 | 4/2004 |
| JP | A-2007-166803 | 6/2007 |
| JP | A-2007-315183 | 12/2007 |

\* cited by examiner

*Primary Examiner*—Nguyen N Hanh
(74) *Attorney, Agent, or Firm*—Oliff & Berridge, PLC (57) ABSTRACT

A hybrid drive unit includes a main body case having a connection portion connected to an engine, the main body case accommodating therein a rotating electric machine; and an inverter case integrated with the main body case, the inverter case accommodating therein an inverter that controls the rotating electric machine, wherein an inverter breather is disposed in a side wall portion of the inverter case on a side of the connection portion so as to provide communication between an inside and an outside of the inverter case.

12 Claims, 8 Drawing Sheets

HYBRID DRIVE UNIT

CROSS-REFERENCE TO RELATED APPLICATION

The disclosure of Japanese Patent Application No. 2008-038992 filed on Feb. 20, 2008 including the specification, drawings and abstract is incorporated herein by reference in its entirety.

BACKGROUND

The present invention relates to a hybrid drive unit.

In recent years, so-called hybrid vehicles having an engine and a rotating electric machine as drive power sources for the vehicles are gaining attention from the viewpoints of, for example, fuel economy and environmental protection. In such a hybrid vehicle, the rotating electric machine works as a motor that obtains electric power from a battery to generate a driving force. In addition to transmitting the driving force to a drive mechanism side to achieve motor drive, the rotating electric machine serves, at times, to charge the battery, in which case the machine obtains a driving force from an engine to work as a generator. In addition, the rotating electric machine performs a so-called energy regeneration during braking, recovering an extra inertia force that the vehicle has as the electric power. The rotating electric machine may, in some cases, be used for starting the engine.

An inverter controls operations of the rotating electric machine. The type of inverter intended for motors converts a DC power source supplied from the battery into an AC power source (U-phase, V-phase, and W-phase for a three-phase configuration) through a switching action, and supplies the AC power source to each coil. The type of inverter used with generators, on the other hand, converts AC generated in each coil into a DC power source through, for example, the switching action, and supplies the DC power source to the battery. In order, at this time, to keep the hybrid drive unit mounted on the vehicle as compact as possible and keep the distance between the inverter and the rotating electric machine to be controlled thereby as short as possible so as to inhibit electromagnetic noise from being generated, a known hybrid drive unit includes a main body case that accommodates therein the rotating electric machine, and an inverter case that is integrally formed with the main body case and accommodates therein the inverter.

To begin with, the inverter is formed to include electronic components, such as a switching device, a diode, and a control circuit. Entry of moisture into the inverter case could therefore result in the electric circuit being damaged by, for example, a short circuit. To avoid this, the inverter case is often built to be liquid-tight. Despite the liquid-tight structure, however, it is likely that, when the temperature inside the inverter case increases as a result of the switching action of the inverter, air inside the case expands and even a small amount of the air will leak through the case. When the case is thereafter cooled, the air inside the case contracts to reduce pressure, so that moisture will enter into the inverter case through a fine gap therein.

To lessen the effect from expansion and contraction of air, therefore, the inverter case typically includes a breather for reducing a difference in atmospheric pressure between the inside and the outside of the inverter case by providing communication there between. The breather is basically structured to allow only gas to pass there through, and not a solid or liquid. The structure is nonetheless not able to prevent the entry of moisture completely. It is therefore preferable that the breather be disposed, wherever feasible, at a low position that is less likely to be in contact with the moisture.

Japanese Patent Application Publication No. JP-A-08-65945 (page 4, FIGS. 1 and 2) discloses an exemplary case, in which the position of a breather in an inverter case is devised to eliminate the possibility of water entering the inverter case easily. In a motor drive unit disclosed in Japanese Patent Application Publication No. JP-A-08-65945, the breather is disposed on a bottom surface of the inverter case such that an opening portion of the breather to the outside of the case opposes a boss portion formed concentrically with a motor shaft on a side surface of a main body case that accommodates therein a motor. The breather is formed by combining two vertical paths extending vertically and horizontal paths extending horizontally relative to the bottom surface of the inverter case. In other words, in the motor drive unit disclosed in Japanese Patent Application Publication No. JP-A-08-65945, the breather is structured such that moisture can enter the inside only when the moisture passes through complicatedly bent paths that provide communication between the inside and the outside of the inverter case. In addition, an arrangement is made to permit ventilation on the side of the main body case between the inside of the main body case and the outside of the motor drive unit through a small gap, the inverter case, and the breather, the small gap being formed around a metal rod that penetrates through the bottom surface of the inverter case and extends across the inverter case and the main body case.

SUMMARY

The arrangement, in which the breather is disposed on the bottom surface of the inverter case and opposes the side surface of the main body case that accommodates therein the motor, offers a greater waterproof property as compared with an arrangement, in which the breather is disposed on a top surface or a side surface. The arrangement, however, results in the area of the bottom surface becoming greater to accommodate a portion corresponding to an area occupied by the breather. This results in the entire drive unit becoming larger.

The present invention has been made in view of the foregoing problem, and it is an object of the present invention to provide a hybrid drive unit capable of reducing the possibility of entry of moisture or other foreign matter without increasing the size of the entire drive unit. The present invention can also achieve various other advantages.

To achieve the foregoing object, according to an exemplary aspect of the invention, a hybrid drive unit includes a main body case having a connection portion connected to an engine, the main body case accommodating therein a rotating electric machine; and an inverter case integrated with the main body case, the inverter case accommodating therein an inverter that controls the rotating electric machine, wherein an inverter breather is disposed in a side wall portion of the inverter case on a side of the connection portion so as to provide communication between an inside and an outside of the inverter case.

BRIEF DESCRIPTION OF THE DRAWINGS

Various exemplary aspects of the invention will be described with reference to the drawings, wherein.

DETAILED DESCRIPTION OF THE EMBODIMENTS

Figure 1:
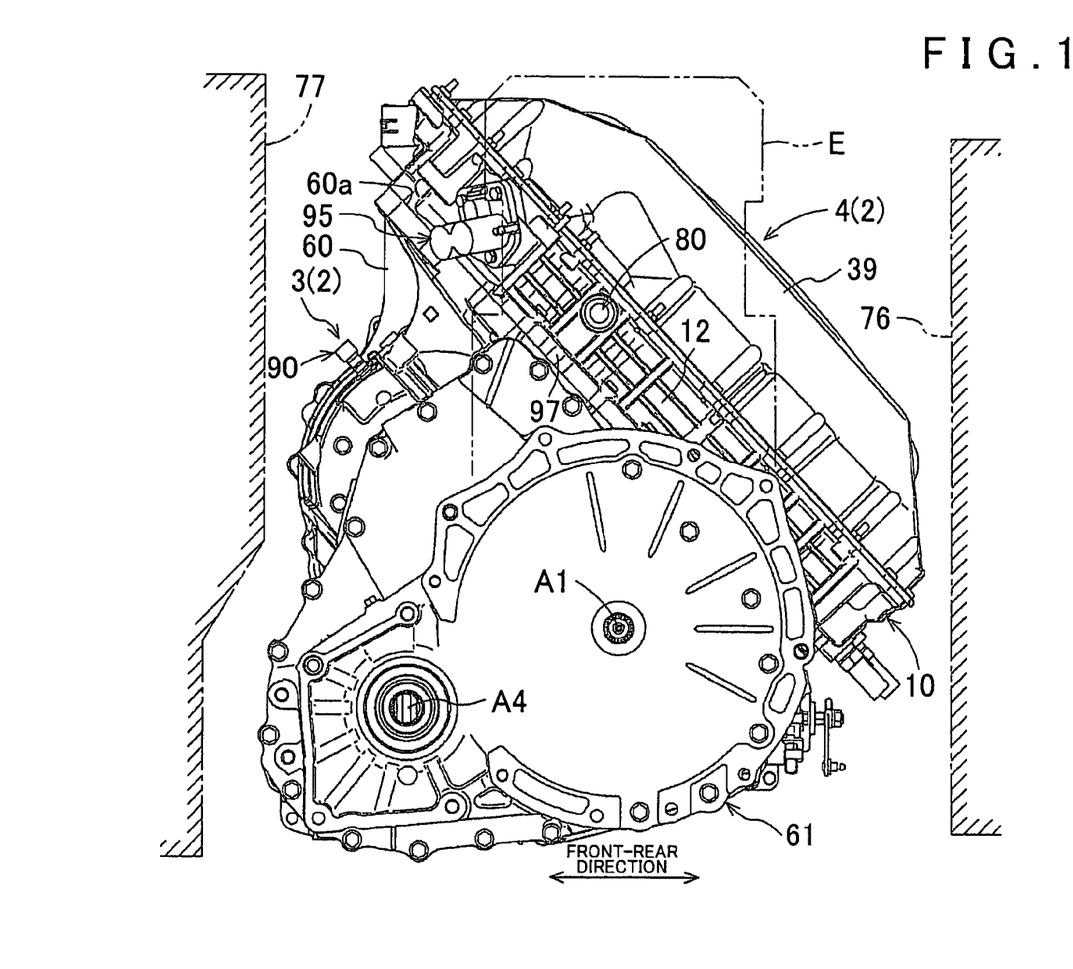
FIG. 1 is a side view showing a drive unit in which a control unit of the drive unit is integrally mounted.
Figure 2:
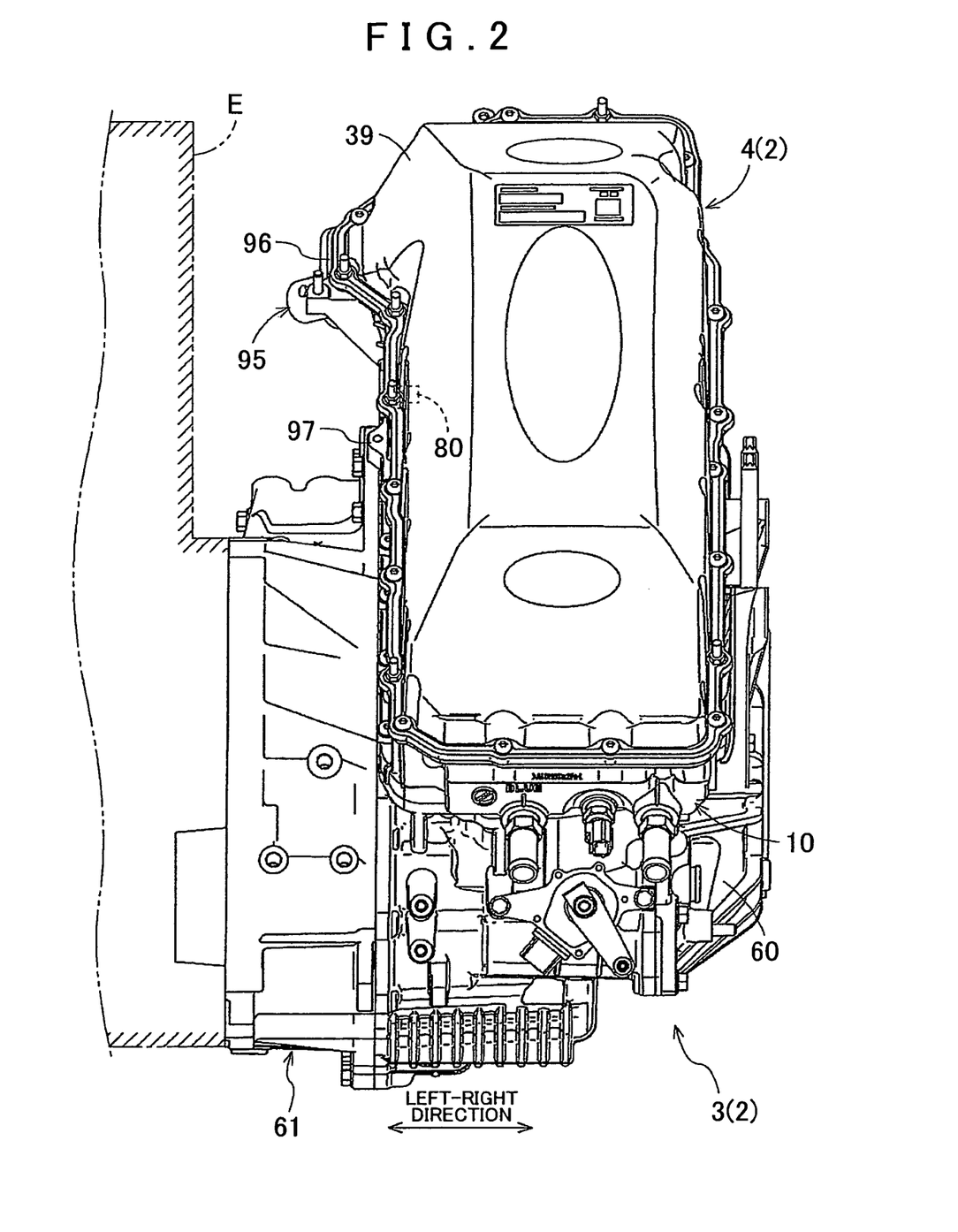
FIG. 2 is a front view showing the drive unit connected to an engine.
Figure 3:
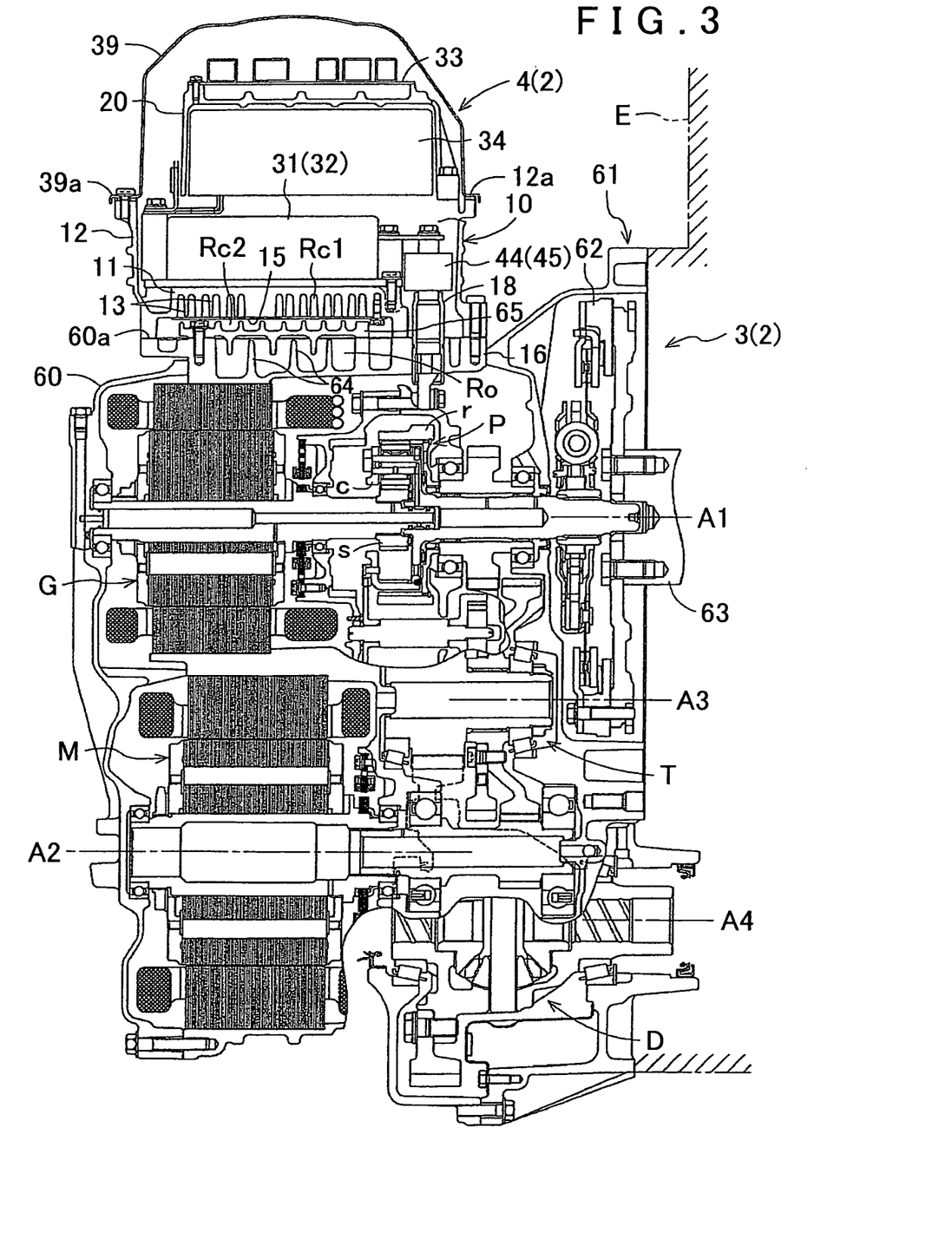
FIG. 3 is an axially developed cross-sectional view showing the drive unit.
Figure 4:
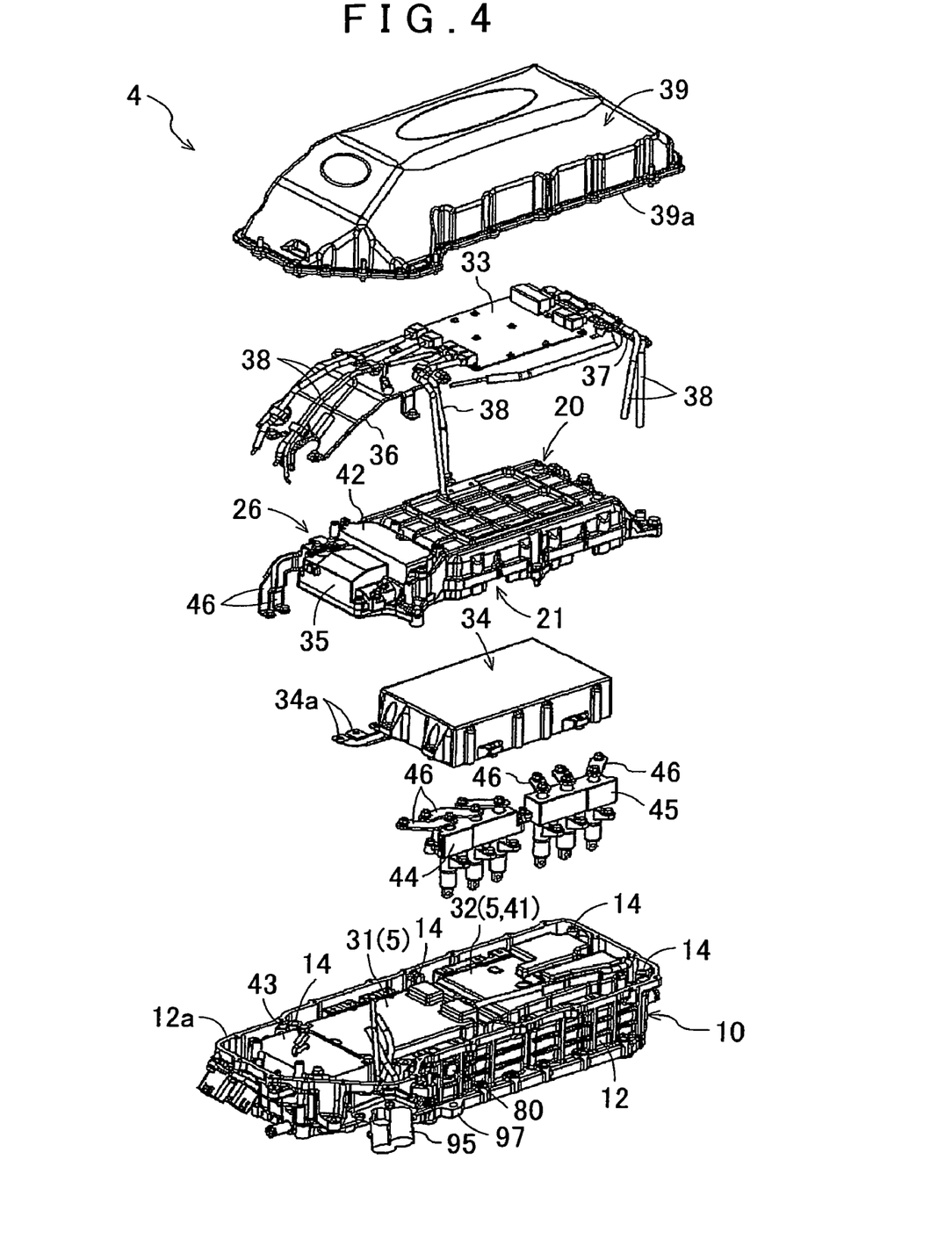
FIG. 4 is an exploded perspective view showing the control unit of the drive unit.
Figure 5:
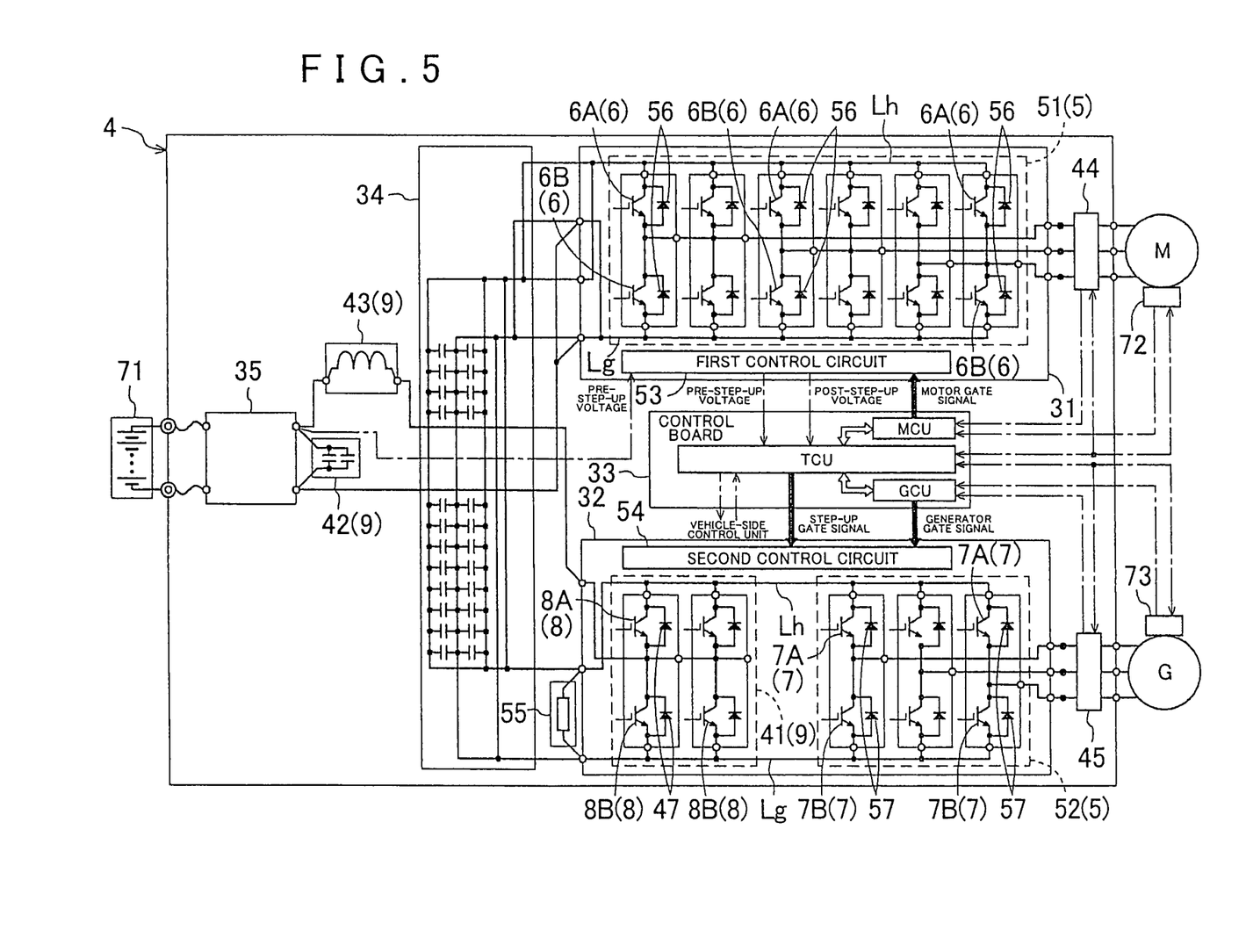
FIG. 5 is a schematic view showing a circuit configuration of the control unit of the drive unit.
Figure 6:
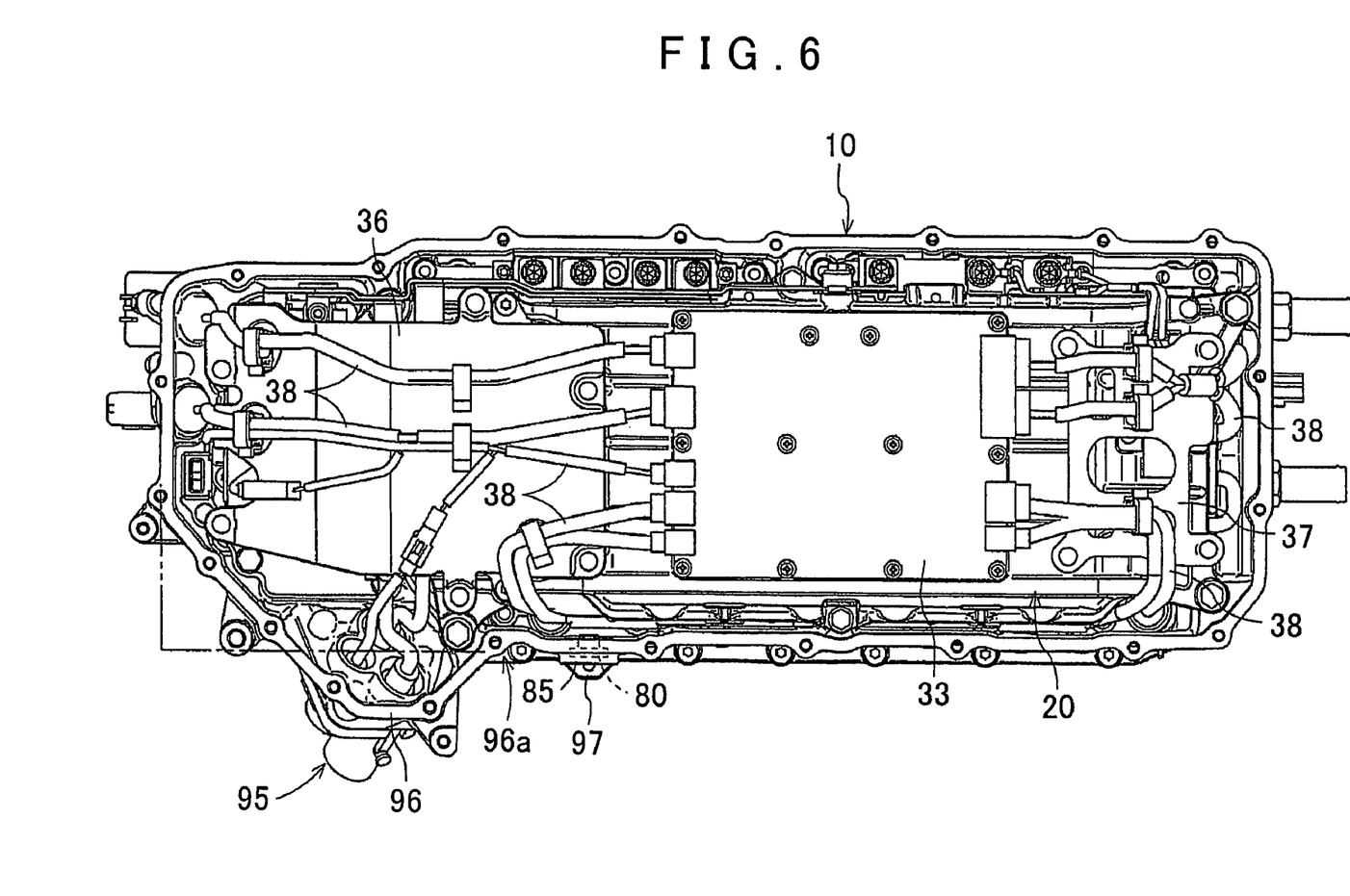
FIG. 6 is a top view showing an inverter case.
Figure 7:
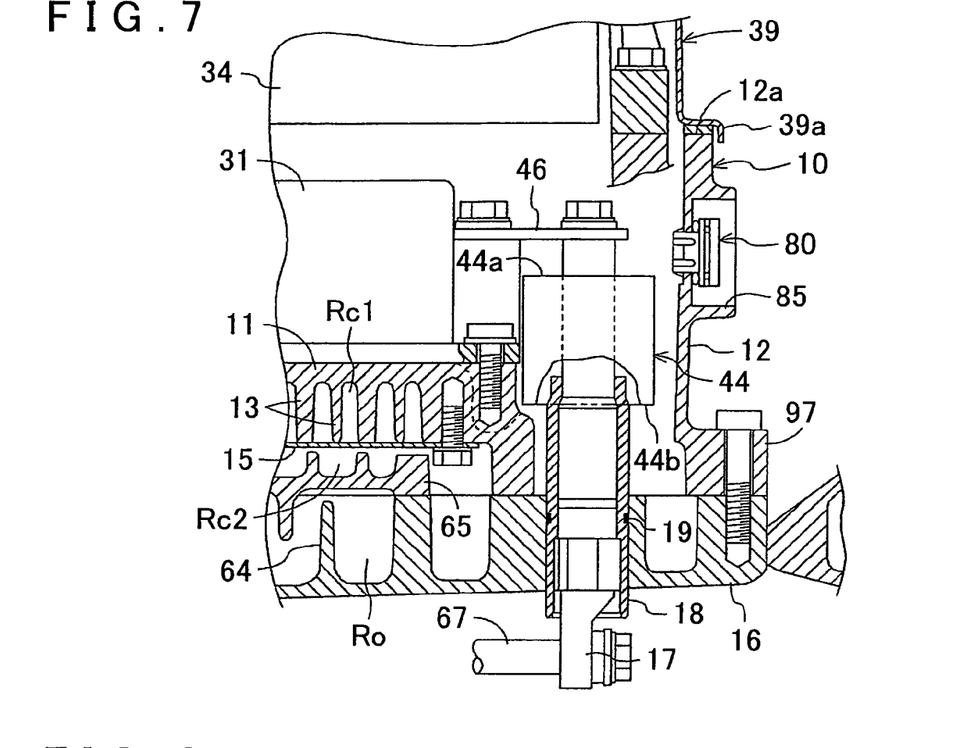
FIG. 7 is a cross-sectional view showing a connection portion between a drive unit case and the inverter case.
Figure 8:
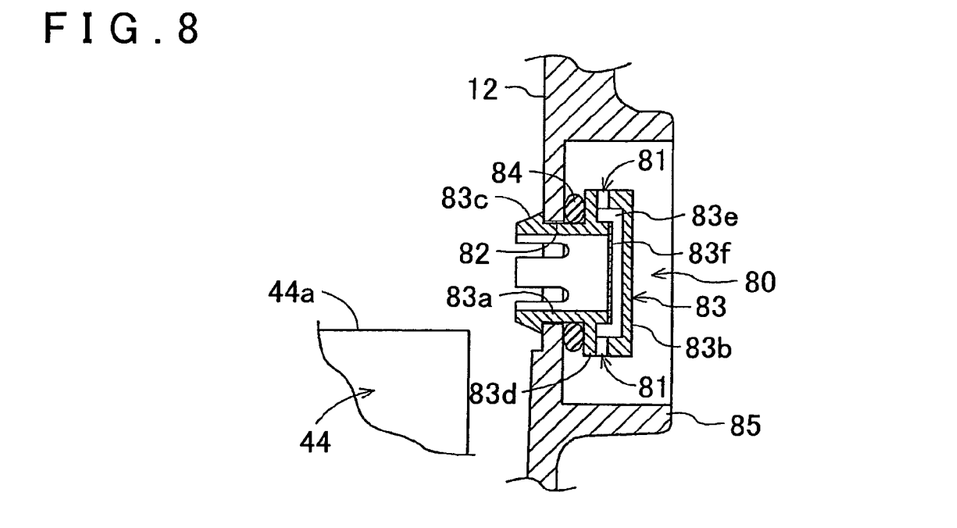
FIG. 8 is a cross-sectional view showing an inverter breather.
Figure 9:
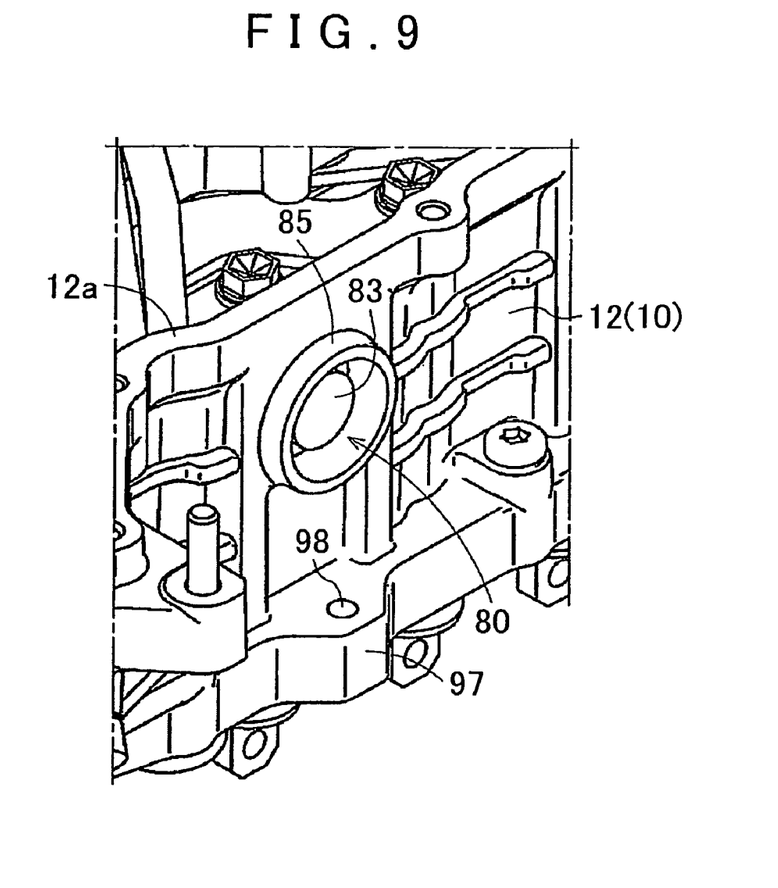
FIG. 9 is a perspective view showing the inverter case having therein the inverter breather.
Figure 10:
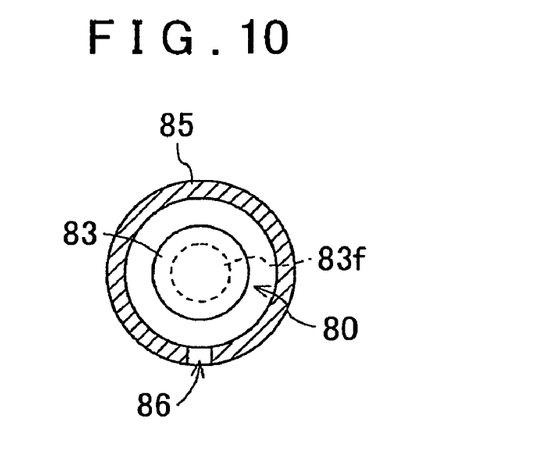
FIG. 10 is a front view showing an inverter breather according to another embodiment and a cylindrical wall disposed there around.

A hybrid drive unit according to an embodiment of the present invention will be described with reference to the drawings. FIG. 1 is a side view showing a hybrid drive unit 2 (hereinafter referred to simply as drive unit 2) in which a control unit 4 is integrally mounted. FIG. 2 is a front view showing the drive unit 2 connected to an engine E. FIG. 3 is an axially developed cross-sectional view showing the drive unit 2. FIG. 4 is an exploded perspective view showing the control unit 4. FIG. 5 is a schematic view showing a circuit configuration of the control unit 4. FIG. 6 is a top view showing an inverter case 10. FIG. 7 is a cross-sectional view showing a connection portion between a drive unit case 60 and the inverter case 10. FIG. 8 is a cross-sectional view showing an inverter breather 80. FIG. 9 is a perspective view showing the inverter case 10 having therein the inverter breather 80. FIG. 10 is a front view showing an inverter breather 80 according to another embodiment and a cylindrical wall 85 disposed there around.

1. Arrangements of the Drive Unit

Arrangements of the drive unit 2 according to this embodiment will first be described. As shown in FIGS. 1 and 2, the drive unit 2 includes a drive unit 3 and the control unit 4. The drive unit 3 includes, for example, a planetary gear mechanism P as a power distribution system, a counter gear mechanism T, a differential device D, a motor M, and a generator G as shown in FIG. 3. The drive unit 3, while changing the speed of a rotation driving force inputted from the engine E, cooperates with the motor M or the generator G to transmit the rotation driving force to a drive wheel of a vehicle. In this embodiment, the motor M and the generator G are examples of a rotating electric machine in the present invention. Further, the control unit 4 includes an inverter 5 that controls operations of the motor M and the generator G.

In this embodiment, the drive unit 2 is disposed adjacent the engine E in, for example, a front engine vehicle, such as an FF (front engine front drive) vehicle. As shown in FIGS. 1 and 2, the drive unit 2 is connected to the engine E via a connection portion 61 formed on the drive unit case 60. The drive unit 2 and the engine E are disposed between a radiator 76 that cools coolant or lubricant and a dividing wall 77 that separates an engine compartment accommodating the engine E and the like from a cabin space.

As shown in FIG. 3, the drive unit 3 includes, as major components thereof, the generator G and the planetary gear mechanism P as the power distribution system disposed on a first axis A1, the motor M disposed on a second axis A2, and the differential device D disposed on a fourth axis A4. In addition, the counter gear mechanism T that drivingly connects an output rotating element of the planetary gear mechanism P and the motor M to the differential device D is disposed on a third axis A3. Note herein that the planetary gear mechanism P is a single pinion type planetary gear mechanism, in which a sun gear s is connected to the generator G, a carrier c is connected to an output shaft 63 of the engine via a damper 62 disposed on the first axis A1, and a ring gear r is connected to the counter gear mechanism T as an output rotating element. These components of the drive unit 3 are accommodated in the drive unit case 60. The drive unit case 60 in this embodiment is an example of the main body case in the present invention.

The control unit 4 is integrally mounted on an upper portion of the drive unit 3. Specifically, as shown in FIG. 1, the inverter case 10 of the control unit 4 is fastened and fixed to an inclined upper surface 60a of the drive unit case 60 disposed so as to contact substantially an outside diameter of the motor M and the generator G, which results in the control unit 4 being integrated with the drive unit 3. In addition to being inclined mounted on the drive unit 3, the control unit 4 has a cover 39 that is formed into a substantially trapezoidal shape having a width (a length in a direction in parallel with the upper surface 60a) that decreases at greater distances away from the drive unit case 60 when viewing the drive unit 2 from the side of the connection portion 61 between the drive unit case 60 and the engine E. Further, the cover 39 is formed such that a first side surface thereof extends substantially horizontally, while a second side surface thereof extends substantially vertically, in a state where the control unit 4 is mounted on the drive unit 3. Thus, the entire drive unit 2 that integrates the drive unit 3 with the control unit 4 has a compact outline with small upward and sideward (rightward in FIG. 1) protrusions.

As shown in FIG. 3, an upper wall 16 is disposed at a joint portion between the drive unit case 60 of the drive unit 3 and the inverter case 10 of the control unit 4. In addition, a cooling structure for cooling switching device modules 31, 32, the motor M, the generator G, and the like is disposed.

The cooling structure includes a hydraulic fluid flow path Ro and a refrigerant flow path. A hydraulic fluid circulating through the inside of the drive unit 3 flows through the hydraulic fluid flow path Ro. A refrigerant, such as cooling water or coolant, flows through the refrigerant flow path. Heat exchange is performed between these. In this embodiment, the hydraulic fluid flow path Ro is formed as a space having fins 64 on an upper surface of the upper wall 16. A heat transfer wall 65 is further mounted so as to cover an opening surface of the space. The heat transfer wall 65 has heat transfer fins on both surfaces thereof, and heat exchange is performed between the hydraulic fluid in the hydraulic fluid flow path Ro and the refrigerant in the refrigerant flow path. In addition, the refrigerant flow path is divided into upper and lower stages by a flatly-shaped spacing member 15 attached on a lower surface of a bottom portion 11 of the inverter case 10. The stage separated by the spacing member 15 on the side of the inverter case 10 is defined as an upper stage refrigerant flow path Rc1, while that separated by the spacing member 15 on the side of the upper wall 16 is defined as a lower stage refrigerant flow path Rc2. Note herein that the upper stage refrigerant flow path Rc1 is formed as a space between cooling fins 13 formed integrally on the bottom portion 11 of the inverter case 10, and the spacing member 15 is disposed so as to cover an opening surface of the space. Additionally, the lower stage refrigerant flow path Rc2 is formed as a space between the spacing member 15 and the heat transfer wall 65, and a surrounding space.

The hydraulic fluid that has circulated through the inside of the drive unit 2 and become hot exchanges heat, while flowing through the hydraulic fluid flow path Ro, with the refrigerant flowing through the lower stage refrigerant flow path Rc2 via the heat transfer wall 65 and is thereby cooled. As will be described later, the switching device modules 31, 32 that make up the inverter 5 generate a large amount of heat because a large current flows there through. The switching device modules 31, 32 are therefore disposed so as to be in contact with an upper surface of the bottom portion 11 of the inverter case 10. The switching device modules 31, 32 thereby exchange heat with the refrigerant that flows between the cooling fins 13 of the upper stage refrigerant flow path Rc1 via the cooling fins 13 formed on the bottom portion 11 of the inverter case 10 and is thereby cooled. In order to perform such heat exchange, the inverter case 10 having the cooling fins 13 and the heat transfer wall 65 should preferably be formed of aluminum or other high thermal conductive material. The spacing member 15, on the other hand, should preferably be formed of a low thermal conductive material in order to inhibit heat exchange between the upper stage refrigerant flow path Rc1 and the lower stage refrigerant flow path Rc2.

The upper wall 16 is disposed so as to be in contact with a joint surface of the bottom portion 11 of the inverter case 10 and the upper surface 60a of the drive unit case 60. A space surrounded by the upper wall 16 and the drive unit case 60 is formed as a drive unit case interior space. In addition, a space between the bottom portion 11 of the inverter case 10 and the cover 39 is formed as an inverter case interior space. In this embodiment, the bottom portion 11 of the inverter case 10 and the upper wall 16 have an opening portion that provides communication between the drive unit case interior space and the inverter case interior space. A connection body 17 penetrates through the opening portion (see FIG. 7). A space between the opening portion in the upper wall 16 and the connection body 17 is made to be liquid-tight by an insulating member 18 and a sealing member 19, as will be described in detail later. As such, the inverter case interior space and the drive unit case interior space are separated from each other with the bottom portion 11 of the inverter case 10 and the upper wall 16 as boundaries. Accordingly, in this embodiment, the bottom portion 11 of the inverter case 10 and the upper wall 16 is an example of a partition wall in the present invention. Note that, in this embodiment, the upper wall 16 is to form a part of the drive unit 3 and the upper surface of the upper wall 16 serves as the upper surface 60a of the drive unit case 60.

The drive unit case 60 includes a main body breather 90. The main body breather 90 is provided separately from the inverter breather 80 to be described later. The main body breather 90 provides communication between the inside and the outside of the drive unit case 60, thereby performing a function of reducing a difference in atmospheric pressure between the inside and the outside of the case. As shown in FIG. 1, the main body breather 90 is disposed on the drive unit case 60 at the uppermost portion of the space inside the drive unit case 60. This allows the main body breather 90 to be less subject to splash of, for example, water in the outside of the drive unit case 60. The arrangement also allows the main body breather 90 to be less subject to splash of oil that circulates, for example, for cooling the motor M and other heat generating bodies or lubricating the planetary gear mechanism P and other rotating members. In addition, the main body breather 90 is disposed at a position at which the main body breather 90 overlaps an outer peripheral side of a coil end of the motor M in the front-rear direction of the vehicle (left-to-right direction in FIG. 1), though not shown in the figure. The main body breather 90, being disposed at the position at which the main body breather 90 overlaps the outer peripheral side of the coil end of the motor M as a stationary member, helps inhibit the oil scattering through rotation of the rotating members of the drive unit 2 including the planetary gear mechanism P from directly scattering over the main body breather 90. There is therefore no likelihood that oil will leak from the main body breather 90.

Additionally, the drive unit 2 includes the connection body 17 that penetrates through the upper wall 16. As described earlier, the upper wall 16 separates the inverter case interior space from the drive unit case interior space. The intervention of the connection body 17, however, allows the switching device modules 31, 32 and the motor M and the generator G to be electrically connected with each other.

2. General Schematic Arrangements of the Control Unit of the Drive Unit

General schematic arrangements of the control unit 4 will next be described. Note that, unless otherwise specified in the description that follows, "upper" denotes a side of the control unit 4 on the side of the cover 39 (upper side in FIG. 4) and "lower" denotes a side of the control unit 4 on the side of the inverter case 10 (lower side in FIG. 4). As shown in FIG. 4, the control unit 4 includes the first switching device module 31, the second switching device module 32, a control board 33, a smoothing capacitor 34, the inverter case 10, and a support bracket 20. Specifically, the first switching device module 31 and the second switching device module 32 form the inverter 5 for driving (controlling) the motor M and the generator G. The control board 33 controls the inverter 5. The smoothing capacitor 34 smoothes an input power source of the inverter 5. The switching device modules 31, 32 are fixed to the inverter case 10. The support bracket 20 is supported by the inverter case 10 and has a first face (upper surface) onto which the control board 33 is fixed and a second face (lower surface) onto which the smoothing capacitor 34 is fixed.

The control unit 4 further includes a step-up switching unit 41 that includes a step-up switching device 8 (see FIG. 5), a step-up capacitor 42, and a reactor 43. These components form a step-up unit 9 that steps up a power source voltage. As will be described later, the step-up switching unit 41 is integrally incorporated into the second switching device module 32. As a result, the step-up switching unit 41 is fixed on the same surface as the switching device modules 31, 32 in the inverter case 10. In addition, the reactor 43 is fixed on the inverter case 10 and the step-up capacitor 42 is fixed on the support bracket 20. Further, the control unit 4 includes a noise filter 35 for removing power source noise. The noise filter 35 is fixed on the support bracket 20 at a position adjacent the step-up capacitor 42.

Note herein that the inverter case 10 includes the bottom portion 11 (see FIG. 3) and a side wall portion 12 provided in a standing condition so as to surround a peripheral portion of the bottom portion 11 to thereby form a box having an open upper surface that is on the side of the support bracket 20. The inverter case 10 is formed of aluminum or other metal material and manufactured through, for example, die-casting. Note that the bottom portion 11 is a flat, substantially rectangular shape (see FIG. 6), and the inverter case 10 is a box shaped substantially like a rectangular parallelepiped with the open upper surface. A plurality of ribs is formed on an outer peripheral surface of the side wall portion 12 in order to enhance heat dissipation of the inverter case 10 and achieve reduced weight and greater stiffness of the inverter case 10. As shown in FIG. 1, the inverter breather 80 is disposed in the side wall portion 12 on the side opposing the engine E. The inverter breather 80 provides communication between the inside and the outside of the inverter case 10, thereby performing the function of reducing a difference in atmospheric pressure between the inside and the outside of the case. The inverter breather 80 will be described in detail later.

The first switching device module 31, the second switching device module 32, and the reactor 43 are accommodated and fixed in the inverter case 10. At this time, the first switching device module 31, the second switching device module 32, and the reactor 43 are disposed so as to be in contact with the bottom portion 11 (see FIG. 3). In addition, a first current sensor 44 and a second current sensor 45 are also accommodated in the inverter case 10. The first current sensor 44 detects the magnitude of current that flows from the first switching device module 31 to the motor M. The second current sensor 45 detects the magnitude of current that flows from the second switching device module 32 to the generator G. In addition, a plurality of mounting portions 14 for mounting the support bracket 20 is disposed along an inner peripheral surface of the side wall portion 12 in the inverter case 10. The support bracket 20 is fastened and fixed to the mounting portions 14, and supported thereon.

The support bracket 20 includes a first box-shaped portion 21 disposed at a lower surface that is on the side of the inverter case 10. The first box-shaped portion 21 is open downwardly. The support bracket 20 is formed from aluminum or other metal material and manufactured through, for example, die-casting. The smoothing capacitor 34 is accommodated and fixed inside the first box-shaped portion 21 of the support bracket 20. The smoothing capacitor 34 is shaped substantially like a rectangular parallelepiped and has a connection terminal 34a that protrudes outside the first box-shaped portion 21 in a state where the smoothing capacitor 34 is accommodated in the first box-shaped portion 21. The control board 33 is fixed to an outer surface of the first box-shaped portion 21 on the side of the cover 39. The support bracket 20 also includes a second box-shaped portion 26 disposed adjacent to the first box-shaped portion 21. The second box-shaped portion 26 is open upwardly (toward the side of the cover 39) in a direction opposite to a direction in which the first box-shaped portion 21 is open. The step-up capacitor 42 is accommodated and fixed inside the second box-shaped portion 26. In addition, the noise filter 35 is fixed beside the step-up capacitor 42 in the support bracket 20 at a side opposite the first box-shaped portion 21.

The support bracket 20 has a first side in a longitudinal direction, to which a first wiring bracket 36 is fixed, and a second side, to which a second wiring bracket 37 is fixed, the first wiring bracket 36 and the second wiring bracket 37 being disposed adjacent the control board 33. Cables 38 to be connected to the control board 33 are fixed on an upper surface of each of the first wiring bracket 36 and the second wiring bracket 37. The switching device modules 31, 32, the smoothing capacitor 34, the step-up capacitor 42, the reactor 43, the current sensors 44, 45, and the like are electrically connected with each other by a plurality of bus bars 46 that connect between predetermined terminals of each of these components in order to form an electric circuit (see FIG. 5) to be described later.

The cover 39 is fixed to an upper surface of the inverter case 10, specifically, to an upper end surface 12a of the side wall portion 12. This makes an internal space covered in the inverter case 10 and the cover 39 liquid-tight, so that entry of moisture into the inside of the inverter case 10 can be prevented and the inside of the inverter case 10 and the different members fixed onto the support bracket 20 can be protected. Note that the cover 39 is fixed to the inverter case 10 as follows. Specifically, bolts as fastening members are passed through fastening holes formed in a flange-like peripheral edge portion 39a formed on a lower end of the cover 39 relative to a plurality of bolt holes formed along the upper end surface 12a of the side wall portion 12 and fastened and fixed.

3. Arrangements of the Electric Circuit of the Control Unit of the Drive Unit

Arrangements of the electric circuit of the control unit 4 will next be described. The control unit 4 controls the motor M and the generator G of the drive unit 2. Note herein that the motor M and the generator G are rotating electric machines driven by three-phase AC. As shown in FIG. 5, the control unit 4 has, as circuit components forming the electric circuit, the first switching device module 31, the second switching device module 32, the control board 33, the smoothing capacitor 34, the noise filter 35, a discharge resistor 55, the step-up capacitor 42, the reactor 43, the first current sensor 44, and the second current sensor 45. A battery 71 as a power source is connected to the control unit 4. The noise filter 35, which will not be described in detail herein, performs the function of removing power source noise of the battery 71. While stepping up the voltage of the battery 71, the control unit 4 converts DC of the battery 71 to three-phase AC at a predetermined frequency and supplies the resultant three-phase AC to the motor M to control the driving condition of the motor M. Further, the control unit 4 controls the driving condition of the generator G, and converts AC generated by the generator G to DC and supplies the DC to the battery 71 to charge the battery 71; or the control unit 4 reconverts the converted DC to the three-phase AC at a predetermined frequency and supplies the AC to the motor M. Note that the motor M has a motor rotation sensor 72 and the generator G has a generator rotation sensor 73. Signals indicating rotation speed detected values are to be outputted to the control board 33.

The first switching device module 31 has a first inverter unit 51 for driving the motor M and a first control circuit 53 built therein. The first switching device module 31 is a one-piece molding of a resin, integrating, for example, the first inverter unit 51, devices and boards forming the first control circuit 53, and terminals connecting the foregoing with the outside. The second switching device module 32 has the step-up switching unit 41 for stepping up the power source voltage, a second inverter unit 52 for driving the generator G, and a second control circuit 54 built therein. The second switching device module 32 is a one-piece molding of a resin, integrating, for example, the step-up switching unit 41, the second inverter unit 52, devices and boards forming the second control circuit 54, and terminals connecting the foregoing with the outside. In this embodiment, the first inverter unit 51 and the second inverter unit 52 are an example of the inverter 5 for driving the rotating electric machine (the motor M and the generator G) in the present invention. Accordingly, the switching device modules 31, 32 having these built therein forms the inverter 5.

The first inverter unit 51 includes, as a first inverter switching device 6, a set of a first upper arm device 6A and a first lower arm device 6B connected in series with each other. Two sets of four first inverter-switching devices 6 are herein provided for each phase (three phases of U-phase, V-phase, and W-phase) of the motor M. In this embodiment, an IGBT (insulated gate bipolar transistor) is used as the first inverter switching devices 6. An emitter of the first upper arm device 6A and a collector of the first lower arm device 6B of each set are connected to coils of each phase (not shown) of the motor M. In addition, a collector of each first upper arm device 6A is connected to a high voltage power source line Lh to which an electric power stepped up by the step-up unit 9 to be described later is supplied. An emitter of each first lower arm device 6B is connected to a ground line Lg connected to a negative terminal of the battery 71. Further, a free wheel diode 56 is connected in parallel with each of the first inverter switching devices 6. These free wheel diodes 56 are also included in the first inverter unit 51. In addition to the IGBT, a power transistor of various other types, such as a bipolar type, a field effect type, and an MOS type, may be used for the first inverter-switching device 6.

The first inverter unit 51 is electrically connected to the control board 33 via the first control circuit 53. The plurality of first inverter switching devices 6 is operated according to a motor gate signal outputted from a motor control unit MCU included in the control board 33. The DC electric power stepped up by the step-up unit 9 is then converted to the three-phase AC electric power at predetermined frequency and current values and the resultant AC electric power is supplied to the motor M. This drives the motor M at a predetermined output torque and rotation speed. The first current sensor 44 disposed between the first inverter unit 51 and the motor M detects the amount of current passed between the first inverter unit 51 and the coil of each phase of the motor M. The value detected by the first current sensor 44 is sent to the motor control unit MCU included in the control board 33.

The second inverter unit 52 includes, as a second inverter-switching device 7, a set of a second upper arm device 7A and a second lower arm device 7B connected in series with each other. A set of two-second inverter-switching devices 7 is herein provided for each phase (three phases of U-phase, V-phase, and W-phase) of the generator G. In this embodiment, the IGBT (insulated gate bipolar transistor) is used as the second inverter switching devices 7. An emitter of the second upper arm device 7A and a collector of the second lower arm device 7B of each set are connected to coils of each phase (not shown) of the generator G. In addition, a collector of each second upper arm device 7A is connected to the high voltage power source line Lh. An emitter of each second lower arm device 7B is connected to the ground line Lg connected to the negative terminal of the battery 71. Further, a free wheel diode 57 is connected in parallel with each of the second inverter switching devices 7. These free wheel diodes 57 are also included in the second inverter unit 52. In addition to the IGBT, a power transistor of various other types, such as the bipolar type, the field effect type, and the MOS type, may be used for the second inverter-switching device 7.

The second inverter unit 52 is electrically connected to the control board 33 via the second control circuit 54. The plurality of second inverter switching devices 7 is operated according to a generator gate signal outputted from a generator control unit GCU included in the control board 33. This causes the second inverter unit 52 to convert the three-phase AC electric power generated by the generator G to the DC electric power and supplies the DC electric power to the battery 71 or the first inverter unit 51. At this time, the second inverter unit 52 controls the rotation speed and the output torque of the generator G by controlling the value of the current flowing through the coil of each phase of the generator G. The second current sensor 45 disposed between the second inverter unit 52 and the generator G detects the amount of current passed between the second inverter unit 52 and the coil of each phase of the generator G. The value detected by the second current sensor 45 is sent to the generator control unit GCU included in the control board 33.

The step-up switching unit 41 includes, as the step-up switching device 8, a set of a step-up upper arm device 8A and a step-up lower arm device 8B connected in series with each other. Two sets of four step-up switching devices 8 are herein provided. In this embodiment, the IGBT (insulated gate bipolar transistor) is used as the step-up switching devices 8. An emitter of the step-up upper arm device 8A and a collector of the step-up lower arm device 8B of each set are connected to a positive terminal of the battery 71 via the reactor 43. In addition, a collector of each step-up upper arm device 8A is connected to the high voltage power source line Lh to which an electric power stepped up by the step-up unit 9 is supplied. An emitter of each step-up lower arm device 8B is connected to the ground line Lg connected to the negative terminal of the battery 71. Further, a free wheel diode 47 is connected in parallel with each of the step-up switching devices 8. These free wheel diodes 47 are also included in the step-up switching unit 41. In addition to the IGBT, a power transistor of various other types, such as the bipolar type, the field effect type, and the MOS type, may be used for the step-up switching devices 8.

The step-up switching unit 41 is electrically connected to the control board 33 via the second control circuit 54. The plurality of step-up switching devices 8 is operated according to a step-up gate signal outputted from a transaxle control unit TCU included in the control board 33. This causes the step-up switching unit 41 to step up the voltage of the battery 71 to a predetermined voltage and supplies the stepped-up voltage to the first inverter unit 51. If the electric power is to be received from the generator G, on the other hand, the plurality of step-up switching devices 8 steps down the voltage generated by the generator G down to a predetermined voltage and supplies the stepped-down voltage to the battery 71. The step-up capacitor 42 is connected in parallel with the battery 71 via the noise filter 35. The step-up capacitor 42 performs the function of smoothing the voltage of the battery 71 and supplying the smoothed DC voltage to the step-up switching unit 41. Accordingly, the step-up unit 9 is formed of the step-up switching unit 41 including the step-up switching device 8, the step-up capacitor 42, and the reactor 43.

The smoothing capacitor 34 is connected between the high voltage power source line Lh to which the electric power stepped up by the step-up unit 9 is supplied and the ground line Lg connected to the negative terminal of the battery 71. The smoothing capacitor 34 performs the function of smoothing the DC voltage stepped up by the step-up unit 9 and supplying the smoothed DC voltage to mainly the first inverter unit 51. The discharge resistor 55 is connected in parallel with the smoothing capacitor 34. The discharge resistor 55 performs the function of discharging electric charge stored in the smoothing capacitor 34 when, for example, the power is off.

The control board 33 is a board on which a control circuit for controlling at least the inverter 5 is formed. In this embodiment, the control circuit is formed to control the step-up switching unit 41, in addition to the first inverter unit 51 and the second inverter unit 52 as the inverter 5. Consequently, the control board 33 controls the drive unit 2 as a whole. From a functional unit viewpoint, the control board 33 includes the transaxle control unit TCU, the motor control unit MCU, and the generator control unit GCU. The transaxle control unit TCU is a control unit for controlling the entire drive unit 2. Herein, a detection value representing the power source voltage before the step-up by the step-up unit 9 (pre-step-up voltage) and a detection value representing the voltage after the step-up (post-step-up voltage) are inputted to the transaxle control unit TCU via the first control circuit 53. In addition, the transaxle control unit TCU exchanges information of various kinds, such as, for example, an accelerator operation amount, a brake operation amount, and the vehicle speed, with a control unit on the side of the vehicle having the drive unit 2 via a communication tool, such as a CAN (controller area network). Based on the information of these kinds, the transaxle control unit TCU generates and outputs an operation command for each of the motor control unit MCU and the generator control unit GCU. Further, the transaxle control unit TCU generates a step-up gate signal as a drive signal driving for each of the step-up switching devices 8 of the step-up switching unit 41 and outputs the signal to the second control circuit 54.

The operation command outputted from the transaxle control unit TCU to the motor control unit MCU and the generator control unit GCU is a command value representing the rotation speed or output torque of the motor M and the generator G. In addition, the value detected by the first current sensor 44 indicating the amount of current passed between the first inverter unit 51 and the coil of each phase of the motor M and the value detected by the motor rotation sensor 72 indicating the rotation speed of the motor M are inputted to the motor control unit MCU. Based on these detection values and the operation command from the transaxle control unit TCU, the motor control unit MCU generates a motor gate signal as a drive signal driving each of the first inverter switching devices 6 of the first inverter unit 51 and outputs the signal to the first control circuit 53. Similarly, the value detected by the second current sensor 45 indicating the amount of current passed between the second inverter unit 52 and the coil of each phase of the generator G and the value detected by the generator rotation sensor 73 indicating the rotation speed of the generator G are inputted to the generator control unit GCU. Based on these detection values and the operation command from the transaxle control unit TCU, the generator control unit GCU generates a generator gate signal as a drive signal driving each of the second inverter switching devices 7 of the second inverter unit 52 and outputs the signal to the second control circuit 54.

4. Disposition of the Inverter Breather

The inverter breather 80 that provides communication between the inside and the outside of the inverter case 10 is disposed in the side wall portion 12 of the inverter case 10 on the side of the connection portion 61 between the drive unit case 60 and the engine E. The inverter breather 80 provides communication between the inside and the outside of the inverter case 10, thereby performing the function of reducing the difference in atmospheric pressure between the inside and the outside of the case. As described earlier, the inverter case 10 of the control unit 4 is fastened and fixed to the inclined upper surface 60a of the drive unit case 60 disposed so as to contact substantially the outside diameter of the motor M and the generator G, which results in the control unit 4 being integrated with the drive unit 3. Note at this time that, as shown in FIG. 1, the inverter case 10 of the control unit 4 is longer in length than the connection portion 61 in the vehicle front-rear direction (left-to-right direction in FIG. 1). Consequently, two ranges exist; specifically, there is a range in which the connection portion 61 and the inverter case 10 vertically overlap each other in the vehicle front-rear direction and there is a range in which the two do not overlap each other. In this embodiment, the inverter breather 80 is disposed in the range in which the connection portion 61 and the inverter case 10 vertically overlap each other in the vehicle front-rear direction. In other words, the inverter breather 80 is disposed in a range of the inverter case 10 upward of the connection portion 61 and sandwiched between two perpendicular planes in contact with an outer peripheral surface of the connection portion 61 (that overlaps with the engine in the front-rear direction). In addition, in this embodiment, the inverter breather 80 is disposed at a position lower than the top of the engine E.

Note that, in this embodiment, the left-right direction of the vehicle means the axial direction of the first axis A1 (see FIG. 3) of the drive unit 2 that is concentric with the output shaft 63 of the engine E and the vehicle front-rear direction means a direction that is orthogonal to the first axis A1 in a horizontal plane including the first axis A1. Further, the vertical direction of the vehicle means a direction that is orthogonal to the first axis A1 in a vertical plane including the first axis A1.

In the FF layout having the drive unit 2 and the engine E disposed adjacently to each other in the vehicle left-right direction as in this embodiment, therefore, the inverter breather 80 is disposed in a space surrounded in the front-to-rear, left-to-right, and up-to-down directions. In other words, the inverter breather 80 is disposed in a space surrounded by the radiator 76 and the dividing wall 77 in the vehicle front-rear direction (left-to-right direction in FIG. 1), the inverter case 10 and the engine E in the vehicle left-right direction (left-to-right direction in FIG. 2), and the connection portion 61 and a vehicle engine hood (not shown) in the vehicle vertical direction (vertical direction in FIGS. 1 and 2). Understandably, the inverter breather 80 is not directly splashed with water or the like from the side of the radiator 76, the dividing wall 77, and the engine hood.

Further, in this embodiment, the engine E and the control unit 4 serve as a type of protection wall, each inhibiting water or the like from directly splashing on the inverter breather 80 from the sides of the engine E and the control unit 4. Specifically, the water or the like is inhibited from splashing on the inverter breather 80 from the vehicle left-right direction. Similarly, the drive unit case 60 and the engine E integrally serve as a type of protection wall, inhibiting water or the like from splashing on the inverter breather 80 from the side of the drive unit 2. In other words, the water or the like is inhibited from splashing on the inverter breather 80 from the underside of the vehicle. The water or the like splashing on the inverter breather 80 while the vehicle is running mainly comes from below as a spray of water that has been splashed up. The arrangement in which the inverter breather 80 is disposed upwardly of, and in an overlapping manner with respect to, the connection portion 61 can inhibit this. In this manner, disposing the inverter breather 80 in a space surrounded in the front-to-rear, left-to-right, and up-to-down directions allows the water or the like to be substantially reliably inhibited from splashing on the inverter breather 80.

As shown in FIGS. 2 and 6, the inverter case 10 includes a protruding portion 96 formed by protruding the side wall portion 12 on the side of the connection portion 61 outwardly. The inverter case 10 is shaped substantially like a rectangle in a top view. Assuming a clear-cut rectangle shown by a chain double-dashed line in FIG. 6, the inverter case 10 has the outwardly protruding shape such that one of four corners is missing and the longest side (the longest side) of a substantially triangular shape that forms the missing corner coincides with one of the four sides of the rectangle. In other words, the protruding portion 96 is formed of an area that is originally supposed to be a corner. In the top view, the area occupied by the inverter case 10 remains substantially constant regardless of whether there is the protruding portion 96. The protruding portion 96 includes a connector 95 disposed therein. The connector 95 connects the battery 71 as the power source and the switching device modules 31, 32 as the inverter 5. The inverter breather 80 is disposed adjacent to the protruding portion 96. Being disposed "adjacent" as the term is used herein means that the protruding portion 96 is disposed at a position at which the protruding portion 96 at least covers the inverter breather 80. Specifically, the protruding portion 96 is disposed at a position that falls within a range that starts with a base portion 96a disposed at a boundary thereof with respect to the inverter case 10 and ends with the length of the longest side. Because the inverter breather 80 is disposed adjacent to the protruding portion 96 in this manner, the protruding portion 96 can cover the inverter breather 80 from an upper rearward of the vehicle, so that the water or the like can be even further inhibited from splashing on the inverter breather 80.

The inverter breather 80 is disposed with respect to the control unit 4 at the side wall portion 12, and not the bottom portion 11 (see FIG. 3) of the inverter case 10, as shown in FIGS. 1 and 4. This eliminates the need for enlarging a bottom area of the bottom portion 11 of the inverter case 10 in order to provide the inverter breather 80. The drive unit 2 can therefore be provided that can reduce the possibility of water or other foreign matter entering without enlarging the entire system.

Additionally, in this embodiment, the inverter breather 80 is disposed at a position overlapping the first current sensor 44 in the longitudinal direction of the inverter case 10. FIG. 7 is an enlarged cross-sectional view showing the connection portion between the drive unit case 60 and the inverter case 10 at the position at which the inverter breather 80 is disposed. The first current sensor 44 is disposed inside the inverter case 10, detecting the magnitude of the current that flows from the first switching device module 31 forming the inverter 5 to the motor M. The drive unit 2 includes the upper wall 16 that separates the inverter case interior space from the drive unit case interior space. The intervention of the connection body 17 that penetrates through the upper wall 16, however, allows the first switching device module 31 and the motor M to be electrically connected with each other. In other words, the first switching device module 31 is connected to the connection body 17 via the bus bars 46, and the motor M is connected to the connection body 17 via wiring (not shown) and a coupling body 67 (see FIG. 7) disposed substantially in parallel with the first axis A1 at an outer peripheral portion of the ring gear r of the planetary gear mechanism P. This results in the first switching device module 31 that forms the inverter 5 being electrically connected to the motor M.

A conductive material, for example copper, is used as the material forming the connection body 17 in the form of, for example, a conductive bar, a conductive plate, or a conductive cable. A cylindrical conductive bar is used in the example shown in the figure. As such, the current that flows from the first switching device module 31 to the motor M flows through the connection body 17 and the first current sensor 44 detects the magnitude of the current that flows through the connection body 17 to thereby detect the magnitude of the current that flows from the first switching device module 31 to the motor M. The insulating member 18 is disposed along an outer periphery near a portion in the upper wall 16 through which the connection body 17 penetrates. The insulating member 18 prevents a short circuit from occurring between the connection body 17 and the upper wall 16. In addition, the sealing member 19, for example an O-ring, is disposed between the insulating member 18 and the upper wall 16. The sealing member 19 makes a space between the insulating member 18 and the upper wall 16 liquid-tight. This ensures that the interior space inside the inverter case 10 and the interior space inside the drive unit case 60 are separated from each other without communicating with each other. The oil that circulates through the inside of the drive unit case 60 for, for example, cooling the motor M and other heat generating bodies or lubricating the planetary gear mechanism P and other rotating members can therefore be prevented from entering the inverter case 10.

The first current sensor 44 is disposed adjacent the side wall portion 12 of the inverter case 10 on the side of the connection portion 61. Further, the inverter breather 80 is disposed at a position not overlapping the first current sensor 44 in a height direction inside the inverter case 10. Note herein that the inverter breather 80 in this embodiment is structured to include a through hole 82 and a breather cap 83 as will be described in detail later. The through hole 82 is disposed in the side wall portion 12 of the inverter case 10 to provide communication between the inside and the outside of the inverter case 10. The breather cap 83 is inserted into the through hole 82. Accordingly, by stating that "the inverter breather 80 does not overlap the first current sensor 44", it is meant that a portion of the breather cap 83 protruding inwardly of the inverter case 10 from the through hole 82 does not overlap an upper surface 44a or a lower surface 44b of the first current sensor 44. Note there is no problem even if a portion of the breather cap 83 protruding outwardly of the inverter case 10 from the through hole 82 overlaps the upper surface 44a or the lower surface 44b of the first current sensor 44.

A certain amount of space for ventilation is necessary in areas around an opening portion of the inverter breather 80 inside the inverter case 10. In this embodiment, however, an outer periphery of any of lock tabs 83c (see FIG. 8) of the breather cap 83 is disposed at a position higher than the upper surface 44a of the first current sensor 44. Accordingly, the inverter breather 80 and the first current sensor 44 do not overlap each other in the height direction inside the inverter case 10. This eliminates the need for providing a space specifically for ventilation between the opening portion of the inverter breather 80 and a side surface of the first current sensor 44. The inverter breather 80 can therefore be provided without making the inverter case 10 larger.

5. Structure of the Inverter Breather

As shown in FIG. 8, the inverter breather 80 includes an outside opening portion 81 that opens in a direction substantially in parallel with the side wall portion 12 on the side of the connection portion 61 that serves as the connection between the drive unit case 60 and the engine E. Additionally, in this embodiment, the inverter breather 80 further includes the through hole 82 disposed in the side wall portion 12 of the inverter case 10 to provide communication between the inside and the outside of the inverter case 10, and the breather cap 83 inserted into the through hole 82.

The breather cap 83 is formed of, for example, ABS resin or other resin material. The breather cap 83 is structured to include a main body portion 83a, a lid portion 83b, a lock tab 83c, a large-diameter portion 83d, a communication path 83e, and a waterproof ventilation film 83f. The main body portion 83a is of a cylindrical shape and inserted into the through hole 82, thus penetrating through the inverter case 10. The lid portion 83b is disposed on an end of the main body portion 83a outside the inverter case 10 substantially perpendicularly relative to a central axis of the main body portion 83a. The lock tab 83c is disposed at an end of the main body portion 83a opposite to the lid portion 83b. The lock tab 83c has a fold-back portion that abuts on an inner wall of the inverter case 10 to prevent the breather cap 83 from coming off. The large-diameter portion 83d is a thick-wall portion of the main body portion 83a disposed on the side of the lid portion 83b of the main body portion 83a. The large-diameter portion 83d is formed to have the same inside diameter as, and a larger outside diameter than, the main body portion 83a. The large-diameter portion 83d has the outside opening portion 81 formed in an outer peripheral surface thereof. Note that the outside opening portion 81 is disposed at a plurality of portions in the circumferential direction of the large-diameter portion 83d.

The communication path 83e is disposed in a radial direction of the large-diameter portion 83d so as to provide communication between a hollow space of the main body portion 83a and the outside opening portion 81 formed on the outer peripheral surface of the large-diameter portion 83d. As a result, the breather cap 83 forming the inverter breather 80 opens in a direction substantially in parallel with the side wall portion 12 of the inverter case 10. Note that, in this embodiment, the communication path 83e is formed like a labyrinth, which also inhibits the water or the like from entering the inverter case 10 easily. The waterproof ventilation film 83f allows only gas to pass there through, but not liquid, and is a porous film formed using, for example, a tetrafluoroethylene resin. The waterproof ventilation film 83f is disposed at a boundary between the main body portion 83a and the communication path 83e. Installing the waterproof ventilation film 83f prevents the water or the like from entering the inverter case 10, even if the water or the like reaches an inside of the communication path 83e.

The breather cap 83 is inserted into the through hole 82 of the inverter case 10 with its side of the lock tab 83c first. The main body portion 83a of the breather cap 83 has a plurality of slits formed circumferentially on its insertion side. This makes the main body portion 83a elastically deformable so as to be inserted into the through hole 82. A sealing member 84, such as an O-ring, is disposed between an output wall surface of the side wall portion 12 of the inverter case 10 and a side wall surface of the large-diameter portion 83d of the breather cap 83 on the side of the inverter case 10. This prevents water or the like from entering into the inverter case through a gap between the through hole 82 and the breather cap 83. Structuring the inverter breather 80 to include the through hole 82 formed in the inverter case 10 and the breather cap 83 inserted thereinto as described above allows the inverter breather 80 having any desired shape to be formed easily by forming the breather cap 83 having any desired shape from, for example, a resin material and inserting the breather cap 83 into the through hole 82.

In addition, the cylindrical wall 85 is disposed around the breather cap 83 outside the side wall portion 12 of the inverter case 10. The cylindrical wall 85 is formed to extend to a position higher than the outside opening portion 81. Note herein that, as described above, the breather cap 83 forming the inverter breather 80 is open in the direction substantially in parallel with the side wall portion 12 of the inverter case 10. In such arrangements, therefore, gas or the like that is about to flow into the inverter case 10 via the inverter breather 80 must temporarily reach a space defined by the side wall portion 12 of the inverter case 10 and an inside of the cylindrical wall 85 disposed therewith, before reaching the outside opening portion 81 that opens in the direction substantially in parallel with the side wall portion 12. Should water or the like splash on an area around the inverter breather 80, therefore, the water or the like can be inhibited from directly entering the inverter case 10.

As shown in FIG. 9, a rib portion 97 having a through hole 98 therein is disposed downwardly of the cylindrical wall 85. A bolt for fastening to fix the drive unit case 60 and the inverter case 10 is passed through the through hole 98. The rib portion 97 is formed to have a height higher than, or substantially equal to, the height of the cylindrical wall 85 from the wall surface of the side wall portion 12. Consequently, the rib portion 97 can also inhibit water or the like from splashing on the inverter breather 80 from the lower side of the vehicle.

6. Other Embodiments (1) The above embodiment has been described for an exemplary case, in which the inverter breather 80 is disposed upwardly of the connection portion 61, in other words, in the range of the inverter case 10 in which the inverter case 10 and the connection portion 61 vertically overlap each other in the vehicle front-rear direction; The inverter breather 80 may, however, be disposed in the range of the inverter case 10 in which the inverter case 10 and the connection portion 61 do not vertically overlap each other in the vehicle front-rear direction, since protection by the engine E is possible as long as the inverter breather 80 is at least disposed in the side wall portion 12 of the inverter case 10 on the side of the connection portion 61.

(2) The above embodiment has been described for an exemplary case, in which the inverter breather 80 is disposed at a position overlapping the first current sensor 44 in the longitudinal direction of the inverter case 10. The inverter breather 80 may nonetheless be disposed at a position in the longitudinal direction of the inverter case 10 at which the inverter breather 80 overlaps the second current sensor 45 that detects the magnitude of the current that flows from the second switching device module 32 forming the inverter 5 to the generator G.

(3) The above embodiment has been described for an exemplary case, in which the outer periphery of any of the lock tabs 83c of the breather cap 83 is disposed at a position higher than the upper surface 44a of the first current sensor 44. The outer periphery of the lock tabs 83c of the breather cap 83 has nonetheless only to be disposed at any position at which the outer periphery does not overlap the first current sensor 44. For example, the outer periphery of any of the lock tabs 83c of the breather cap 83 may be disposed at a position lower than the lower surface 44b of the first current sensor 44.

Further, the inverter breather 80 may be disposed at a position in the longitudinal direction of the inverter case 10 at which the inverter breather 80 overlaps neither the first current sensor 44 nor the second current sensor 45. In this case, the inverter breather 80 may be at any height in the inverter case 10.

(4) The above embodiment has been described for an exemplary case, in which the inverter breather 80 is structured to include the through hole 82 that is disposed in the side wall portion 12 of the inverter case 10 to provide communication between the inside and the outside of the inverter case 10, and the breather cap 83 that is inserted into the through hole 82. The inverter breather 80 may nonetheless be integrally formed in the side wall portion 12 of the inverter case 10.

(5) The above embodiment has been described for an exemplary case, in which the cylindrical wall 85 that surrounds the entire circumference of the breather cap 83 is disposed. Preferably, however, the cylindrical wall 85 includes a cutout portion 86 in a perpendicularly downward direction as shown in FIG. 10. The cutout portion 86 helps discharge water or the like efficiently in the perpendicularly downward direction, should the water or the like reach a space defined by the side wall portion 12 of the inverter case 10 and the inside of the cylindrical wall 85 disposed therewith. This further reduces the possibility of the water or the like entering the inverter case 10. Note that, as long as the inverter breather 80 is disposed upwardly of the connection portion 61 (see FIG. 2) as in the above embodiment, the drive unit case 60 and the engine E are integrally present in the perpendicularly downward direction in which the cutout portion 86 is formed. This inhibits water or the like from splashing from the lower side of the vehicle, so that such a cutout portion 86 does not necessarily result in a demerit of enhanced ease with which the inverter breather 80 is splashed with water or the like. In addition, the rib portion 97 is disposed so as to cover the cutout portion 86. The rib portion 97 can therefore inhibit the water or the like from splashing on the inverter breather 80 from the side of the cutout portion 86.

(6) The above embodiment has been described for an exemplary case, in which the space between the insulating member 18 disposed on the outer periphery of the connection body 17 and the upper wall 16 is liquid-tight. As long as the inverter case interior space and the drive unit case interior space are isolated from each other in the liquid-tight manner, however, the space between the insulating member 18 disposed on the outer periphery of the connection body 17 and the bottom portion 11 of the inverter case 10 may be kept in the liquid-tight manner. Alternatively, the space between the insulating member 18 disposed on the outer periphery of the connection body 17 and the bottom portion 11 of the inverter case 10, and that between the insulating member 18 disposed on the outer periphery of the connection body 17 and the upper wall 16 may be kept in the liquid-tight manner.

The present invention can be preferably adapted for use in a hybrid drive unit including a main body case that has a connection portion connected to an engine and accommodates therein a rotating electric machine and an inverter case that is integrally formed with the main body case and accommodates therein an inverter that controls the rotating electric machine.

Note that, in the present invention, "rotating electric machine" is used to include concepts of a motor, a generator, and a motor generator that achieves the function of the motor or the generator as necessary.

According to an exemplary aspect of the invention, the inverter breather is disposed in the side wall portion of the inverter case on the side of the connection portion that serves as a portion to which the engine is connected relative to the main body case, so that the inverter breather opposes the engine in the side wall portion of the inverter case. The engine therefore serves as a type of protection wall, inhibiting water or the like from splashing directly on the inverter breather from the side of the engine. At this time, the inverter breather is disposed at the side wall portion, and not a bottom portion, of the inverter case, which eliminates the need for enlarging a bottom surface area of the inverter case. A hybrid drive unit can therefore be provided that can reduce the possibility of moisture or other foreign matter from entering without increasing the size of the entire drive unit.

According to an exemplary aspect of the invention, the main body case and the engine are connected together at the connection portion, and the inverter breather is disposed upwardly thereof in an overlapping manner. The main body case and the engine therefore integrally serve as a type of protection wall, enabling to inhibit water or the like from splashing on the inverter breather from a lower side of the drive unit. Consequently, a spray of water or the like splashed up while the vehicle is running can be inhibited from splashing on the inverter breather from below.

According to an exemplary aspect of the invention, the inverter breather is disposed at a position lower than the engine and overlapping the engine in the front-rear direction, so that the inverter breather surely opposes the engine in the side wall portion of the inverter case. The engine therefore serves as a type of protection wall, inhibiting water or the like from splashing directly on the inverter breather from the side of the engine.

With this arrangement, the connection body penetrates through the partition wall in a liquid-tight manner, which separates the space inside the inverter case from the space inside the main body case without providing communication there between. Oil that circulates through the inside of the main body case, for example, for cooling a heat generating body or lubricating a rotating member can therefore be prevented from entering the inverter case. At this time, the connection body penetrates through the partition wall to electrically connect the inverter with the rotating electric machine. This achieves a short path length for electric connection. The entire drive unit can therefore be compactly formed, and the generation of electromagnetic noise can be inhibited.

Further, the main body case includes the main body breather disposed separately from the inverter breather. This helps lessen the effect from expansion and contraction of air inside the main body case. The main body breather is disposed in the main body case at the uppermost portion of the space inside the main body case. This reduces the possibility of moisture or other foreign matter from entering the main body case, and inhibits oil scattering inside the main body case from splashing on the main body breather.

A certain amount of space for ventilation is necessary in areas around an opening portion of the inverter breather inside the case. According to an exemplary aspect of the invention, the inverter breather and the current sensor do not overlap each other in the height direction inside the inverter case. This eliminates the need for providing a special space between the opening portion of the breather and a side surface of the current sensor. The inverter breather can therefore be provided without making the inverter case larger.

According to an exemplary aspect of the invention, the connector required for connecting the inverter with the power source that supplies the inverter with an electric power is accommodated in the protruding portion, and the protruding portion adjoins the inverter breather so as to partially cover the inverter breather. This enables to further inhibit water or the like from splashing on the inverter breather.

According to an exemplary aspect of the invention, the outside opening portion opens in the direction substantially in parallel with the side wall portion on the side of the connection portion. Should water or the like splash on the wall surface of the side wall portion of the inverter case from a substantially vertical direction, the water or the like can be prevented from directly reaching the outside opening portion. In addition, even if water or the like splashes on an area around the inverter breather, the cylindrical wall can prevent the water or the like from reaching the inverter breather by way of the wall surface of the inverter case. Even in such cases, therefore, the water or the like can be inhibited from immediately entering the inverter case.

According to an exemplary aspect of the invention, should water or the like reach a space defined by the wall surface of the side wall portion of the inverter case and the inside of the cylindrical wall, the water or the like can be discharged from the cutout portion efficiently in the perpendicularly downward direction. This enable to reduce the possibility of the water or the like from entering the inverter case even further.

According to an exemplary aspect of the invention, the inverter breather can be formed by forming only the through hole in the inverter case and forming the separate breather cap having any desired shape, and by inserting the breather cap into the through hole. An inverter breather having any desired shape can therefore be formed.

What is claimed is:

1. A hybrid drive unit comprising:
    a main body case having a connection portion connected to an engine, the main body case accommodating therein a rotating electric machine; and
    an inverter case integrated with the main body case, the inverter case accommodating therein an inverter that controls the rotating electric machine,
    wherein an inverter breather is disposed in a side wall portion of the inverter case on a side of the connection portion so as to provide communication between an inside and an outside of the inverter case.

2. The hybrid drive unit according to claim 1, wherein the inverter breather is disposed upwardly of the connection portion in an overlapping manner.

3. The hybrid drive unit according to claim 2, wherein the inverter breather is disposed at a position lower than a top of the engine and overlaps the engine in a front-rear direction.

4. The hybrid drive unit according to claim 3, wherein:
    the inverter case includes a connector disposed at a protruding portion formed by protruding the side wall portion on the side of the connection portion outwardly, the connector connecting the inverter with a power source, and
    the inverter breather is disposed adjacent the protruding portion.

5. The hybrid drive unit according to claim 1, further comprising:
    a partition wall separating a space inside the inverter case from a space inside the main body case;
    a connection body penetrating through the partition wall in a liquid-tight manner, the connection body connecting electrically the inverter and the rotating electric machine; and
    a main body breather disposed in the main body case at an uppermost portion of the space inside the main body case.

6. The hybrid drive unit according to claim 4, further comprising:
    a current sensor that detects a magnitude of current flowing through the connection body, wherein:
    the current sensor is disposed adjacent the side wall portion of the inverter case on the side of the connection portion, and
    the inverter breather is disposed at a position that does not overlap the current sensor in a height direction inside the inverter case.

7. The hybrid drive unit according to claim 1, wherein:
    the inverter breather includes an outside opening portion that opens in a direction substantially parallel with the side wall portion on the side of the connection portion, and
    a cylindrical wall is disposed to extend to a position higher than the outside opening portion in an area surrounding the inverter breather in the inverter case.

8. The hybrid drive unit according to claim 7, wherein the cylindrical wall includes a cutout portion in a perpendicularly downward direction.

9. The hybrid drive unit according to claim 1, wherein the inverter breather includes a through hole disposed in the side wall portion of the inverter case to provide communication between the inside and the outside of the inverter case and a breather cap inserted into the through hole.

10. The hybrid drive unit according to claim 9, further comprising:
    a current sensor disposed adjacent the side wall portion of the inverter case on the side of the connection portion,
    wherein a portion of the breather cap protruding inwardly of the inverter case from the through hole does not overlap the current sensor in a height direction.

11. The hybrid drive unit according to claim 1, wherein:
    the inverter case is longer in length than the connection portion in a vehicle front-rear direction, and
    the inverter breather is disposed in a range in which the connection portion and the inverter case vertically overlap each other in the vehicle front-rear direction.

12. The hybrid drive unit according to claim 1, wherein the inverter breather is disposed in a space surrounded by a radiator and a dividing wall in a vehicle front-rear direction, the inverter case and the engine in a vehicle left-right direction, and above the connection portion in a vehicle vertical direction.

* * * * *